May 17, 1966  S. K. ADITYA  3,251,653
DOUBLE-CONE REACTOR FOR VAPOR-PHASE REACTIONS
Filed Nov. 13, 1962
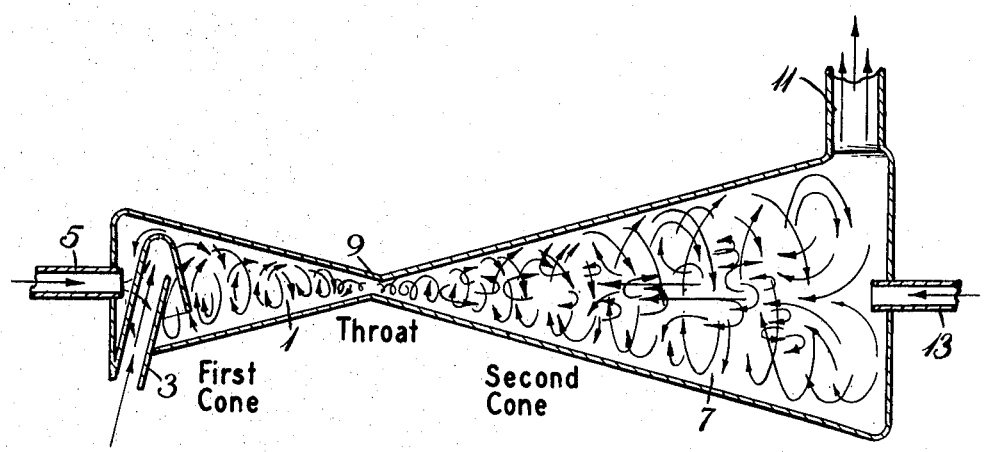
INVENTOR.
SUSANTA K. ADITYA
BY
Francis M. Fazio
ATTORNEY

United States Patent Office 3,251,653
Patented May 17, 1966

3,251,653
DOUBLE-CONE REACTOR FOR VAPOR-PHASE
REACTIONS
Susanta K. Aditya, Charleston, W. Va., assignor to Union
Carbide Corporation, a corporation of New York
Filed Nov. 13, 1962, Ser. No. 237,169
7 Claims. (Cl. 23—252)

This invention relates to a novel method for carrying out vapor-phase reactions and to an apparatus therefor. In one aspect, the present invention is concerned with a method for the interaction of vaporous materials while maintaining said vaporous materials in a state of high turbulence and substantial homogeneity, wherein said vaporous materials are substantially completely back-mixed. In another aspect this invention is concerned with double-cone reactors for effecting vapor phase reactions in the above manner.

Many well known vapor-phase reactions are highly exothermic and liberate enormous quantities of heat which must be removed from the reaction vessel. Commercially, these reactions are generally carried out in ordinary tubular reactors, the reactants being contacted therein, allowed to react for a specified residence time, and the products recovered by known means. The heat of reaction is usually controlled by external or internal cooling coils, by cooling jacket, or by similar means. It can be appreciated, however, that such heat removal means are not always practicable in commercial units in view of the extremely large sizes of the reactors which are employed. Another problem which often limits the utility of tubular reactors is localized overheating and formation of the so-called "hot spots" in the reactor. For example, in the oxidation of lower saturated aliphatic hydrocarbons, such as propane, butane, etc., which is extremely exothermic, unless adequate and uniform mixing of oxygen with the hydrocarbon is insured, there will be a tendency for over-concentration of oxygen in certain sections of the reactor resulting in localized overheating and formation of hot spots. When this occurs, the hydrocarbon materials are decomposed and carbonaceous compounds are deposited in the interior of the reactor at the "hot spot" areas, impairing the heat transferability and the conversion of hydrocarbons to the desired products. This difficulty can be alleviated to some extent by increasing the velocity of the materials through the reactor (decreasing the residence time); however, the conversion per pass to the desired products is considerably diminished thereby.

It has now been unexpectedly discovered that localized heating and formation of hot spots can be eliminated by conducting the vapor-phase reaction in a double-cone reactor. It has been found that a high degree of turbulence and substantially complete back-mixing of the vaporous materials can be obtained by the use of the double-cone reactor as hereinafter described.

The novel reactor comprises two conical zones connected at their apexes, and intercommunicating via a converging-diverging zone, hereinafter referred to as a "throat," which throat is formed by joining the two apexes of said conical zones by known means.

The novel reactor will be more completely described in connection with the attached drawing which is a schematic sideview of a double-cone reactor of this invention. The novel features of the double-cone reactor of this invention are more clearly understood with reference to an illustrative vapor-phase reaction such as, for example, the oxidation of propane with oxygen to propylene oxide, acetaldehyde, and other oxygenated organic compounds.

With reference to the drawing, there is shown a conical zone 1 which serves essentially as a premixing zone where-in the vaporous feed materials are substantially completely mixed. Conical zone 1 is provided with feed lines 3 and 5 at or near the base thereof for the introduction of propane and oxygen, respectively. Additional feed lines may be provided if desired. Feed line 3 forms an angle of up to about 30°, preferably 10° to 20° with the normal to the axis of said conical zone 1, said line 3 extending into said conical zone 1 a distance of up to about 4 times the outside diameter of said line 3, preferably from about 0.5 to about 2 times the outside diameter of said line 3, in order to induce a spiraling motion of the feed in said conical zone 1 and to insure adequate mixing of the vaporous materials. Feed line 5 is substantially parallel to the axis of said conical zone 1, though it can form a slight angle therewith if desired. The apex angle (cone angle) of said conical zone 1 can vary from about 10° to about 40°, preferably from about 15° to about 35°, and is most preferably about 30°.

The vaporous materials usually enter at the base of said conical zone 1, move inward toward the apex thereof in tangential paths of decreasing radii, thus increasing in angular velocity. Intercommunicating with said conical zone 1 there is shown a second conical zone 7 which serves essentially as the reactor for carrying out the vapor-phase reaction. Conical zones 1 and 7 are suitably joined at their apexes so as to form a converging-diverging throat 9. The premixed vaporous materials from conical zone 1 pass through said throat 9 and expand into said conical zone 7, spiraling toward the base thereof in paths of progressively increasing radii, and hence of lower velocity. In this manner, a pressure gradient is set up between the apex and the base of said conical zone 7, the highest pressure being at the base thereof where the angular velocity of the spiraling vaporous materials is the smallest. This pressure gradient causes a back-flow of the vaporous materials toward the apex of said conical zone 7, creating turbulence and back-mixing therein as evidenced by the formation of small eddies. Throat 9, therefore, is a region of high velocity and low pressure, causing the turbulence and back-mixing in said zone 7 which is a characteristic of the novel reactor. Conical zone 7 is provided with a product withdrawal line 11 at the periphery thereof and preferably adjacent to the base of said zone 7. Said conical zone 7 may also be provided with an auxiliary line 13 at the base thereof through which cold feed or inert gaseous materials may be introduced to control the reaction temperature if necessary. The use of said auxiliary line 13 is optional depending upon whether or not the reaction temperature must be controlled, or whether or not additional feed materials must be introduced in said zone 7. When used, said auxiliary line 13 need not extend inward, but preferably it extends a distance of from about 2 to 5 times the outside diameter of said auxiliary line 13 into the base of said zone 7. Thus auxiliary line 13 provides an extremely efficient means for controlling the reaction temperature by internal cooling of zone 7.

The apex angle of said conical zone 7 can also vary from about 10° to about 40°, preferably from about 15° to about 35°, and is most preferably about 30°. Thus the apex angles of said conical zones 1 and 7 may or may not be identical. Also, the relative spatial arrangements of said conical zones 1 and 7 may or may not be symmetrical though the latter spatial configuration is preferred. The volume ratio of conical zone 7 (reaction zone) to conical zone 1 (premixing zone) can vary from about 5:1 or less, to about 30:1, or more, and is preferably from about 10:1 to about 20:1. The residence time of the vaporous reactants in the premixing zone is a very small fraction of the total residence time in the double-cone reactor. The velocity of the vaporous materials through the throat is high and the residence time of said vaporous materials in conical zone 1 and in the throat is a very small fraction of the residence time in the double-cone reactor, consequently the reaction takes place essentially adiabatically in conical zone 7.

The design of the throat is important in the present invention. The throat diameter must be so sized as to give a $$\frac{U_0^2 r_0}{d^2}$$

value of from about 300 ft./sec.$^2$, or less, to about 5000 ft./sec.$^2$, or more, preferably from about 600 to about 1000 ft./sec.$^2$, wherein $U_0$ is the average linear velocity in feet per second of the vaporous materials traveling through the throat, $r_0$ is the radius in feet of the throat and $d$ is the distance in feet from the base of the larger cone to the apex thereof (determined by projecting the sides defining the apex angle, and determining the point of intersection). The throat diameter referred to above is the diameter of the narrowest section of said converging-diverging throat 9.

The total volumetric capacity of the double-cone reactor is of course dependent upon the quantity of materials being handled. The distance from the apex to the base of each conical zone can vary depending upon the relative volumes of said zones as well as their respective apex angles.

The velocity of the vaporous feed materials in feed line 3 must be sufficiently high to thereby establish and maintain a spiraling motion of the contents of conical zone 1 and to facilitate substantially complete mixing of the vapors therein. The vapor velocity in said feed line 3 can range from about 10 feet per second, or lower, to about 200 feet per second, or higher and preferably from about 30 feet per second to about 60 feet per second. It is understood, of course, that the desired velocity in said feed line 3 can be obtained by adjusting the flow rate of the vapor feed flowing therethrough and/or by the inside diameter of said line 3.

The double-cone reactor of this invention can be positioned so that the principal axis thereof is parallel to the horizontal plane, or forms an angle therewith, or is perpendicular thereto, though it is preferably positioned so that its principal axis is parallel to the horizontal plane. The novel reactor can be constructed of ordinary materials of construction or from corrosion-resistant materials, depending on whether or not corrosive substances are present therein.

The following examples serve to illustrate the advantages of the double-cone reactor over conventional tubular reactors for vapor-phase reactions.

*Example 1*

A feed mixture consisting of 62 mole percent propane, 20 mole percent propylene, 10 mole percent carbon monoxide and 8 mole percent oxygen was fed at the rate of 122.5 cubic feet per hour (25° C. and 14.7 p.s.i.a.) to a 0.37 inch by 20 feet long tubular reactor. The reactor was shaped in the form of a helical coil with approximately 21 turns, each having 2.8750 inches diameter, and was immersed in a molten lead bath which was maintained at 450° C. The mixture was reacted at 450° C., 45 p.s.i.g. and approximately 0.4 second residence times in the reactor and the reactor effluent, after passing through a water-cooled condenser to condense the high boiling materials, was analyzed for acetaldehyde and propylene oxide by chemical methods.

The yields of acetaldehyde and propylene oxide per liter of reactor effluent gas (0° C. and 760 mm. mercury) were 38.2 and 34.8 milligrams respectively, representing corresponding efficiencies of 34.0 pounds acetaldehyde and 30.9 pounds propylene oxide per 100 pounds of $C_3$-hydrocarbons which were consumed in the oxidation reaction. The productivities to acetaldehyde and propylene oxide were respectively 33.8 and 30.8 pounds per hour per cubic foot of reactor volume.

*Example 2*

One hundred and seventy-five cubic feet per hour (25° C. and 14.7 p.s.i.a.) of a feed mixture described in Example 1 was charged to a double-cone reactor consisting of two 30°-cones having volumes of 25 cc. and 200 cc. respectively. The cones were welded at their apexes to form a throat 3 millimeters in diameter. The oxygen was introduced separately into the smaller cone through 0.25 inch O.D. tube parallel to the axis of said cone and the remainder of the feed was introduced tangentially into said cone via 0.3750 inch O.D. tube which formed an angle of 15° with the normal to the axis of the cone. The larger cone (reaction sections) was provided with 0.5 inch O.D. tube for product withdrawal and with a thermocouple to measure the temperature in said cone. The effluent from the larger cone, after passing through a water-cooled condenser, was analyzed for acetaldehyde and propylene oxide in the same manner as in Example 1.

The yields of acetaldehyde and propylene oxide were 45.7 and 28.4 milligrams per liter of reactor effluent gas (0° C. and 760 mm. mercury) respectively, corresponding to efficiencies of 44.1 and 28.7 pounds per 100 pounds of $C_3$-hydrocarbons which were consumed in the oxidation reaction. The productivities of acetaldeyde and propylene oxide were respectively 63.0 and 39.2 pounds per hour per cubic foot of reactor volume (volume of larger cone).

From the foregoing two examples it will be observed that the vapor-phase oxidation of propane to acetaldehyde and propylene oxide is more efficient in a double-cone reactor as compared to a tubular reactor. This is evidenced by the greater efficiency and higher productivity obtained in the double-cone reactor.

Although oxygen was employed for the oxidation of propane in the foregoing examples, any oxygen-containing gas can be satisfactorily employed. In addition, the feed to the double-cone reactor can be extended to include lower aliphatic saturated hydrocarbons and other reactants which are usually reacted in the vapor phase.

It is further understood that the operative conditions with respect to temperature, pressure and the residence time of the materials in the double-cone reactor can vary depending upon the feed materials which are employed. These conditions are ascertainable for each system by a person skilled in the art. It is important, however, to conduct the vapor-phase reaction under conditions which establish and maintain back-mixing of the contents of conical reaction zone by virtue of the pressure differential between the throat and the base of said conical zone.

As was previously mentioned, the application of the double-cone reactor is not necessarily restricted to the oxidation of propane. Rather the novel reactor is equally applicable to a variety of other vapor phase reactions wherein homogeneity, back-mixing and turbulence of the vaporous materials are important, and wherein elimination of localized heating is essential to successful commercial utilization of the vapor-phase reaction.

It is of course understood that minor modifications can be made in the novel reactor without substantially departing from the spirit of the invention.

What is claimed is:

1. A double-cone reactor for vapor-phase reactions comprising, in combination, a smaller conical zone having a base and an apex, said conical zone being provided with inlet lines for introducing vaporous materials therein and wherein at least one of said inlets forms an angle of up to about 30° with the normal to the axis of said smaller conical zone and extending therein a distance of up to about 4 times the outside diameter of said inlet line, a larger conical zone having a base and an apex and a volume of from about 5 to about 30 times the volume of said smaller conical zone, said larger conical zone being provided with product withdrawal means at its outer periphery near the base thereof, said two conical zones intercommunicating via a converging-diverging throat formed by joining the apexes of said two conical zones, each said conical zone having an apex angle of from about 10° to about 40°.

2. The reactor of claim 1 wherein the apex angle of each said conical zone is from about 15° to about 35°.

3. The reactor of claim 1 wherein the throat defined by the joined apexes of said two conical zones is sized so as to result in a $$\frac{U_0^2 r_0}{d^2}$$

value of from about 300 ft. sec.² to about 5000 ft./sec.² and wherein $U_0$ is the average linear velocity, in feet per second, of the vaporous materials in said throat, $r_0$ is the radius, in feet, of said throat and $d$ is the distance, in feet, from the base of said larger conical zone to the apex thereof.

4. The reactor of claim 3 wherein said throat is sized so that said $$\frac{U_0^2 r_0}{d}$$

value is from about 600 ft./sec.² to about 1000 ft./sec.²

5. The reactor of claim 1 wherein said feed inlet is disposed at an angle of from about 10° to about 20° with respect to the normal to the axis of said smaller conical zone and extends therein a distance of from about 0.5 to about 2.0 times the outside diameter of said line.

6. The reactor of claim 1 wherein said two conical zones are symmetrical with respect to their common axis.

7. The reactor of claim 1 wherein the common axis of said two conical zones is disposed in parallel relation to the horizontal plane.

References Cited by the Examiner

UNITED STATES PATENTS

| | | | |
|---|---|---|---|
| 1,678,225 | 7/1928 | Kincade | 259—4 |
| 2,413,586 | 12/1946 | Skoog | 23—259.5 |
| 2,420,999 | 5/1947 | Ayers | 23—259.5 |
| 2,790,838 | 5/1957 | Schrader | 260—679 |
| 2,895,978 | 7/1959 | Brooks | 260—451 |
| 2,998,466 | 8/1961 | Braconier et al. | 23—284 XR |
| 3,006,944 | 10/1961 | Fenske et al. | 260—451 |
| 3,102,004 | 8/1959 | Grintz | 23—252 |
| 3,105,745 | 10/1963 | Vieli | 23—252 |

MORRIS O. WOLK, *Primary Examiner.*

LEON ZITVER, JAMES H. TAYMAN, Jr., *Examiners.*